United States Patent [19]
Benedict

[11] 3,918,305
[45] Nov. 11, 1975

[54] FLOW NOZZLE FOR FLOW MEASUREMENT OF AN INCOMPRESSIBLE FLUID

[75] Inventor: Robert P. Benedict, Media, Pa.

[73] Assignee: Westinghouse Electric Corporation, Pittsburgh, Pa.

[22] Filed: May 28, 1974

[21] Appl. No.: 473,963

[52] U.S. Cl. .................................................. 73/211
[51] Int. Cl.² ........................................... G01F 1/42
[58] Field of Search ............................ 73/211, 213

[56] References Cited
UNITED STATES PATENTS

| | | |
|---|---|---|
| 1,559,155 | 10/1925 | Bullock .................................. 73/211 |
| 1,850,030 | 3/1932 | Pardoe ................................... 73/213 |
| 2,284,013 | 5/1942 | Pardoe ................................... 73/213 |
| 3,410,138 | 11/1968 | Lynch .................................... 73/213 |
| 3,636,765 | 1/1972 | Brown ................................... 73/213 |
| 3,736,797 | 6/1973 | Brown ................................... 73/213 |

*Primary Examiner* — Herbert Goldstein
*Attorney, Agent, or Firm* — G. M. Medwick

[57] ABSTRACT

A flow nozzle for incompressible fluid flow measurements. A turbulence promoter is disposed on the converging portion of the nozzle to provide a continuous turbulent boundary layer along the nozzle surface.

4 Claims, 5 Drawing Figures

FLOW NOZZLE FOR FLOW MEASUREMENT OF AN INCOMPRESSIBLE FLUID

BACKGROUND OF THE INVENTION

1. Field of the Invention

This invention relates to flow measurements, and in particular, to a new flow nozzle for measurement of an incompressible fluid flow.

2. Description of the Prior Art

Rate of fluid flow in a steam turbine power plant system is, perhaps, the most useful system parameter to ascertain. In order to efficiently design and operate the system, knowledge of the fluid flow rate of the steam within the closed steam turbine system is essential.

In a closed loop turbine system, comprising, in series, a steam generator element, a turbine element, a condenser element and a feed pump element, it is commonly the practice to insert a flow meter in the system intermediate between the condenser element and the pump. This flow meter, usually a flow nozzle, is placed in the system and, by measurement of the pressure differential between the influent and effluent condensed steam flow into and out of the nozzle, provides accurate measurement of the flow rate through the entire system.

It is common knowledge to those skilled in the flow measurement art that the theoretical rate of flow for an incompressible fluid, such as condensed steam or water, is dependent upon the square root of the change in pressure of the influent and effluent flows of the nozzle. Such theoretical formulations and descriptions of the physics involved are well known, and among the basic sources available on the subject is the inventor's volume, "Fundamentals of Temperature, Pressure, and Flow Measurement", published by John Wiley & Sons, Inc., 1969.

In that cited text, it is stated that the theoretical flow rate of a constant density, incompressible fluid (such as water) in a closed channel (such as a pipe), is given by the relationship:

$$\text{Flow Rate}_{Ideal} = A_2 \left[ \frac{2 g w (p_1 - p_2)}{1 - \beta^4} \right]^{1/2}$$

Where:

$A_2$ is defined as the area of the nozzle outlet, $g$ is the acceleration due to gravity, $w$ is the specific weight of the fluid, $\beta$ is defined as the ratio of diameters of the nozzle inlet and the nozzle outlet, $\beta^2$ is the ratio of areas of the nozzle inlet and the nozzle outlet, and the quantity $(p_1 - p_2)$ is the pressure drop across the flow meter.

From the above relationship, it is apparent that the theoretical incompressible fluid flow rate is directly proportional to the square root of the pressure drop across the nozzle. Of course, the theoretical flow rates for the subsonic and supersonic regimes of fluid flow are not relevant here, consideration being directed only to the theoretical flow rate for a fluid in the incompressible regime.

Although various adjustments to the theoretical flow rate relationship are made to account for differing geometric configurations of the fluid meter, it is always true that, in general, the theoretical flow rate of an incompressible fluid is dependent upon the change in pressure across the nozzle.

For example, the American Society of Mechanical Engineers, ASME, specifies various geometric shaped nozzles for flow measurement, and, for the well-known long-radius flow nozzle of the type under consideration in this application, such parameters as the curvature of the converging section of the nozzle and the length of the converging section are taken into account in the derivation of the theoretical relationship. Another parameter specified by the ASME when adjusting the theoretical flow rate for a particularized flow meter geometry is the extremely precise finish imparted to the flow nozzle. All nozzles heretofore utilized in development of theoretical relationships have an extremely fine finish on the converging portion thereof, and all theoretical calculations of flow rate have assumed such a finish as a given parameter.

Although physicists and those expert in flow rate analysis are able to calculate the theoretical flow rate for a flow of incompressible fluid through a particular fluid meter in a closed channel, the prediction of the actual flow rate, given the theoretical flow rate for the geometry involved, requires utilization of a constant known as the Discharge Coefficient. It is well known that the actual flow rate is equal to the product of the theoretical flow rate and the Discharge Coefficient. It is seen that in addition to the availability of the theoretical flow rate through a particular fluid meter, the Discharge Coefficient is also required in order to accurately predict the actual flow rate of fluid in the system. The relationship between the theoretical flow rate and the discharge coefficient for a particular flow meter is usually available in graphical form.

However, it is well established in the art that the plot of the quantity Discharge Coefficient against the Reynolds Number, (which parameter involves the actual flow rate through the fluid meter, such as a fluid flow nozzle having known geometrical parameters and a predetermined finish), exhibits a marked transition or "hump" when the flow rate (indicated by the Reynolds Number) reaches a certain predetermined range of values. This hump usually begins to occur for a Reynolds Number of approximately $5 \times 10^5$. Of course, as mentioned above, the Reynolds Number is directly dependent, within a constant, upon the actual flow rate.

For Reynolds Numbers below the critical value, the plot of the quantity Discharge Coefficient against Reynolds Number is an increasing function, closely approximating a linear relationship, exhibiting a pronounced positive slope. For Reynolds Numbers beyond the critical transition value, that is, in the range of $10^6$ to $10^8$, the plot of the quantity Discharge Coefficient against the Reynolds Number is again nearly linear, with a slightly positive slope.

However, in the critical region, the plot of the quantity Discharge Coefficient against the Reynolds Number deviates from the projected intersection of these linear functions, and exhibits the pronounced hump, indicating values much in excess of those predicted by any graphical analysis.

It is now accepted in the art that the transition area and the hump on the plots is caused by the shift in the fluid flow from a "laminar boundary layer" to a "turbulent boundary layer".

As is known to those skilled in the fluid dynamics art, those portions of a fluid flow near a solid boundary extending parallel to the fluid flow produce, due to frictional forces, a layer of fluid moving at a velocity slower than the velocity of the fluid in the free stream. The free stream is that portion of the flow away from the solid boundary. As a result, the portion of the flow near the solid boundary and moving at velocities much slower than the free stream velocity is termed the boundary layer. The boundary layer exerts a retarding force on the rest of the fluid substantially perpendicular to the solid boundary, so that more of the fluid in the free stream is slowed and so that the size of the boundary layer therefore increases. In a closed pipe having a flow nozzle therein, the results of a generation of the boundary layer are apparent. In the converging portion of the nozzle, a boundary layer grows along the entire finely polished surface. When the boundary layer does not completely fill the flow channel, but instead exists only near the solid boundaries of the channel so as to leave the flow near the center of the channel at the free stream velocity, and when the boundary layer is composed of layers of fluid sliding on one another, the boundary layer is termed "laminar".

However, due both to the increasing size of the boundary layer and to the converging geometry of the solid boundary (the nozzle) itself, there comes a point in the flow through the nozzle when the boundary layer no longer flows in layers, but instead there is a random interchange of energy between the various sections of the boundary layer. At this point, the boundary layer is termed "turbulent". Such a term is an apt semantic description of the situation extant within the channel when the boundary layer is "tripped", or changes, from laminar to turbulent.

The transition from laminar to turbulent boundary layers causes the hump which is always observed in the relationship between the discharge coefficient and the Reynolds Number. As was mentioned before, at lower Reynolds Numbers before the transition point, the boundary layer is laminar, and the relationship between the quantity Discharge Coefficient and the Reynolds Number is linear with a large positive slope. At higher Reynolds Numbers after the transition, the boundary layer is turbulent, and the plot of the quantity Discharge Coefficient against the Reynolds Number is linear with a lesser slope. However, in the critical transition region, no accurate plot of the relationship between the Discharge Coefficient and the Reynolds Number is obtainable. That critical transition area of the Reynolds Number is, however, precisely that flow rate region wherein most steam turbine systems, and especially nuclear steam turbine systems, operate. Hence, it is imperative that some method of developing an accurate relation between the theoretical flow rate and the Reynolds Number and the Discharge Coefficient be obtained. One method of developing an accurate portrayal of the relationship is to devise analytical expressions which, when plotted, closely approximate the observed characteristic fluid flow through a particular nozzle configuration with a particular finish.

Various scholars, the inventor among them, have devised analytical relationships to approximate the transition hump which occurs on all plots of Discharge Coefficient and Reynolds Number. A compendium of the most notable Rational, Semirational, and Empirical Techniques is compiled in the author's text "Fundamentals of Temperature, Pressure, and Flow Measurements", at pages 301 to 305, inclusive. Also, in this regard, the inventor, with the assistance of J. Wyler, has devised a newer and more accurate relationship for the Discharge Coefficient which is presented in a paper to the American Society of Mechanical Engineers titled "A Generalized Discharge Coefficient For Differential Pressure-Type Fluid Meters", in *Transactions, A.S.M.E., Journal of Engineering For Power*, October 1974, page 440.

Although analytical expressions are available which closely approximate the relationship between the Discharge Coefficient and the theoretical flow rate, various problems remain when utilizing such an analytical approximation.

Firstly, the analytical formulation is still only an approximation, and, as such, is not completely reliable. Also, the possibility of empirically proving the reliability of the formulation is limited because test facilities cannot provide calibration testing beyond those flow rates which produce the "transition hump". Even more importantly, no basis for accurately extrapolating the Discharge Coefficient for higher Reynolds Number, on order of $10^6$ to $10^8$ is available. Thus, no usable and accurate data is obtainable using the analytical approximation method of portraying the relationship between Discharge Coefficient and theoretical flow rate.

Another method of overcoming the hump problem, independent and different from the development of analytical approximation, is to alter the physical structure of the flow nozzle itself. That such an approach may be efficacious is discernible from an analysis of the physical process in the flow which produces the hump.

As is stated earlier, since the hump is engendered by the rapid transition of flow in a nozzle from a laminar to a turbulent boundary layer, and since the transition from laminar to turbulent boundary layers is an incident of the geometric of the flow nozzle and the interaction of the flow with the nozzle, if the nozzle's geometry is altered so as to preclude a transition in the flow from laminar to a turbulent boundary layer, the hump which graphically portrays that physical transition in the flow is eliminated.

Some attempts in the prior art have been made to eliminate the hump which appears in the graphical relationship between the discharge coefficient and the Reynolds Number by physical alteration of the fluid meter itself. For example, Merriam Company of Cleveland, O. has attempted to eliminate the hump by maintaining the laminar boundary layer over a greater flow range. This is accomplished by disposing within an enlarged section of the flow channel a bundle of parallel tubes. By introducing the flow into the bundle of parallel tubes, the large flow rate entering the distended area of the closed channel is reduced to a summation of slower flows, thus maintaining a laminar boundary layer throughout. However, such a method is disadvantageous for flows having Reynolds Numbers in excess of $10^6$ due to the size of the physical accommodations which must be made.

SUMMARY OF THE INVENTION

This invention provides a new flow nozzle for an incompressible fluid flow which has a physically altered configuration so as to prevent a transition within the flow from a laminar to a turbulent boundary layer. The flow nozzle taught by this invention has a converging portion adjacent a cylindrical throat portion. Pressure taps are located upstream and downstream of the flow nozzle, the upstream pressure tap located before the flow enters the converging portion of the nozzle and the downstream pressure tap being disposed within the cylindrical throat portion of the nozzle. Turbulence promoting means are located on the nozzle in a predetermined location so as to "trigger" the laminar boundary layer into a turbulent boundary layer to provide a continuous turbulent boundary layer along the surface of the cylindrical throat before the downstream pressure tap. By "triggering" the laminar boundary layer into a turbulent boundary layer, before the downstream pressure tap, the transition hump brought about by the transition from laminar to turbulent boundary layers is eliminated.

It is an object of this invention to provide a flow nozzle having an altered physical configuration so as to eliminate a transition in the flow from a laminar to turbulent boundary layers.

It is a further object of this invention to provide a flow nozzle with a physical geometry so that the flow characteristic thereof exhibits no transition hump characteristic.

It is still a further object of this invention to provide a flow nozzle which exhibits a linear Discharge Coefficient and flow rate characteristic and thus permits accurate interpolation for fluid flows of Reynolds Numbers in the range of $10^6$ to $10^8$, and higher.

BRIEF DESCRIPTION OF THE DRAWINGS

The invention will be more fully understood from the following detailed description of the illustrative embodiment taken in connection with the accompanying drawings, in which.

DESCRIPTION OF THE PREFERRED EMBODIMENT

Figure 1:
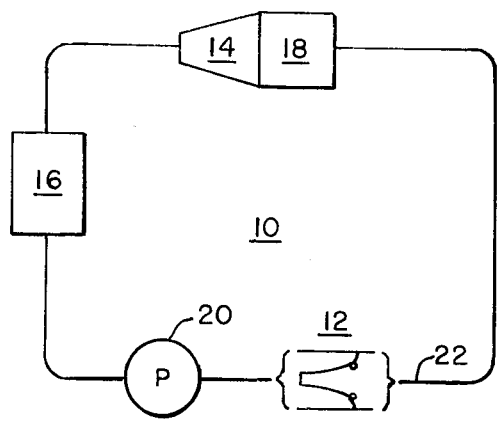
FIG. 1 is a diagrammatic view illustrating a nuclear steam turbine power plant having a fluid meter embodying the teachings of the invention disclosed therein.

Throughout the following description, similar reference characters refer to similar elements in all figures of the drawings.

Referring first to FIG. 1, a diagrammatic view of a nuclear steam turbine power plant 10 having a fluid meter 12 embodying the teachings of this invention disposed therein is illustrated. In FIG. 1, a nuclear steam turbine element 14 is shown connected in series to a steam generator element 16 and a condenser element 18. Compressible fluid, in the form of high pressure, high temperature steam, is produced by the steam generator 16, enters and expands through the turbine element 14 to produce useful work. After expanding through the turbine element 14, the steam is collected and returned to the liquid state in the condenser element 18. The condenser element is connected to the steam generator element 16 to complete the closed, series-connected system. A pump element 20 is interposed between the condenser element 18 and the steam generator 16. The fluid flow meter 12 is commonly disposed in the system between the condenser element 18 and the pump 20.

As is well known to those skilled in the art, the most important parameter used in determining the operating characteristics and capabilities of a steam turbine power plant 10 is perhaps the fluid flow rate. Since this parameter is of such vital importance, the flow meter 12 is commonly disposed within a conduit 22 in the steam system 10 intermediate between the condenser element 18 and the pump 20.

The actual fluid flow rate through a fluid meter is, as is well known to those skilled in the flow measurement art, a product of the theoretical flow rate through the meter and a constant known as the Discharge Coefficient. The theoretical flow rate is dependent upon the pressure drop across the fluid meter and also upon various geometric parameters of the meter itself. For example, for a long-radius fluid meter, such parameters as the length of the converging portion of the meter, the ratio of areas of the inlet and outlet, and the degree of finish imparted on the converging portion of the meter are relevant in formulating the theoretical flow rate.

Figure 2:
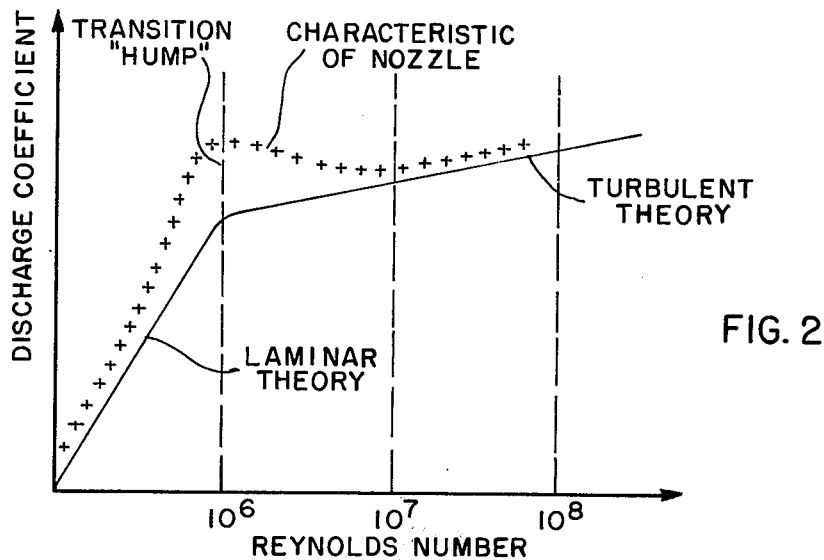
FIG. 2 is a graphical depiction of the relationship between actual flow rate (as described by the Reynolds Number) and discharge coefficient for a prior art flow meter.

A relationship exists between the Discharge Coefficient and the actual flow rate. An example of a graphical portrayal of the relationship between the Discharge Coefficient and the actual flow rate for a prior art, long-radius flow nozzle is shown in FIG. 2. In FIG. 2, the abscissa is the Reynolds Number which is dependent within a constant to the actual flow rate. The ordinate in FIG. 2 is the Discharge Coefficient. The dotted curve on FIG. 2 indicates the empirical relationship between the Discharge Coefficient and the Reynolds Number. Solid lines superimposed on FIG. 2 indicate the relationship for a purely turbulent boundary layer flow and for a purely laminar boundary layer flow through the fluid flow nozzle.

As observed from the plot in FIG. 2, the empirical depiction indicates a marked deviation from the predicted norm in the area of transition between the laminar to turbulent boundary layer. It is generally accepted that the "transition hump" is due to the physical transition within the flow through the nozzle itself from a flow exhibiting a laminar boundary layer to one exhibiting a turbulent boundary layer.

Since the Discharge Coefficient is utilized to obtain the actual fluid flow rates through the meter, predicting the actual flow rate for any given geometric nozzle is not reliable due to the large variation in the Discharge Coefficient value in the transition area. This is especially troublesome since the transition area where the hump occurs is precisely the area of operation of large nuclear steam power plants. In addition, no reliable extrapolation of the Discharge Coefficient for greater values of Reynolds Number is possible.

Figure 3:
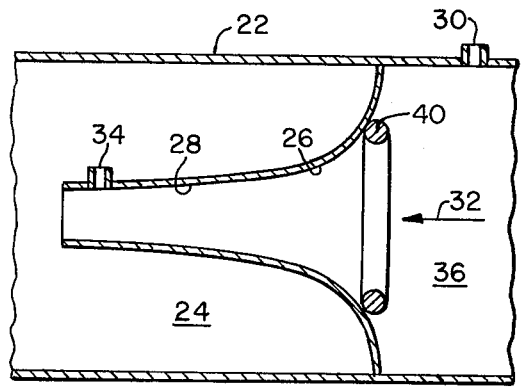
FIG. 3 is an enlarged view of an embodiment of a flow nozzle taught by this invention.

Referring now to FIG. 3, a flow fluid meter 12 embodying the teachings of this invention is shown. In FIG. 3, the fluid meter 12 is a long radius flow nozzle 24 having a converging portion 26 and a cylindrical throat portion 28. The meter 12 is connected within the conduit 22 between the condenser 18 and the pump member 20 (FIG. 1). As is also well known, the flow rate in a closed channel, such as the closed pipe 22, depends directly upon the change in pressures between the influent flow and the effluent flow of the flow nozzle 24. For this purpose, a first pressure tap 30 upstream of the nozzle 24 (the flow being as indicated by the flow direction arrow 32) permits measurement of the pressure of the incompressible fluid before entry into the flow nozzle 24. The first tap 30 is within a turbulent boundary layer, the turbulent layer having been established by the long straight run of piping which precedes the tap 30. As the flow enters the meter 12, it starts again as a laminar flow. A second downstream flow measurement tap 34 is disposed on the cylindrical throat 28 of the nozzle 22. As was stated previously, the flow rate of the incompressible fluid through the system is dependent upon the difference in pressure of the fluid as measured by the upstream pressure tap 30 and the downstream pressure tap 34.

As is well known in the prior art, the fluid nozzle 22 is covered with a finely polished surface. The specifications for the polished surface are promulgated by the American Society of Mechanical Engineers (ASME), which sets the standards for fluid flow measurements and fluid flow measuring devices. See, for example the finish requirements as promulgated by the ASME and as cited by the inventor in his text, above, at page 19.

In order to eliminate the deleterious hump engendered by the transition from the laminar to the turbulent boundary layer, the flow nozzle 22 is physically altered from prior art nozzles by disposing turbulence promoting means 36 on a predetermined portion of the fluid meter 22 on the upstream side of the second pressure tap 34. The turbulence promoting means 36 is disposed so as to trigger the laminar boundary layer which builds up in the fluid flow so as to provide a continuous turbulent boundary layer past the second pressure tap 34.

In the embodiment illustrated in FIG. 3, the turbulence promoting means 36 comprises a wire-like ridge 40 disposed circumferentially about a predetermined portion of the converging portion 26 of the fluid nozzle 22. The purpose of the wire-like ridge 40 is to trip or trigger the laminar boundary layer so as to provide a continuous turbulent flow past the second pressure tap 34. Since the fluid flow is thus tripped into a turbulent boundary layer, no transition occurs between a laminar into a turbulent boundary layer, therefore, the uncertainties attendant upon the transition hump exhibited by a finely polished flow nozzle do not occur with a nozzle embodying the teachings of this invention. Thus, the relationship between the discharge coefficient and the flow rate can be accurately depicted as exhibiting a purely linear characteristic, as exemplified by the turbulent portion of FIG. 2. Also, since the plot of the discharge coefficient against the flow rate embodied by a particular Reynolds Number exhibits a linear plot, certain extrapolations for the discharge coefficient for higher Reynolds Numbers than are available in calibration laboratories may be obtained.

Figure 4:
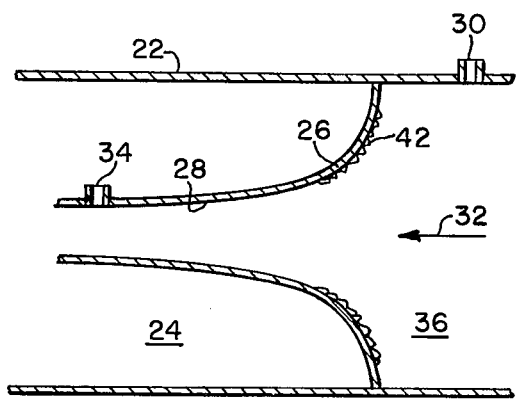
FIG. 4 is an enlarged view, similar to FIG. 3, showing another embodiment of a flow nozzle taught by this invention.

Referring to FIG. 4, another embodiment of the invention is illustrated. In FIG. 4, the physical configuration of the nozzle 22 is altered by disposing turbulence promoting means 36 which comprise a roughened surface 42 of the fluid nozzle 22. By knurling the converging portion 26 of the fluid nozzle 22 to trigger the laminar boundary layer into a turbulent boundary layer, a continuous turbulent boundary layer passes over the surface of the fluid nozzle 22 past the second pressure tap 34. Thus, the uncertainties attended by the transition hump are eliminated since no transition between laminar to turbulent boundary layers occurs. The flow is a pure turbulent flow.

Figure 5:
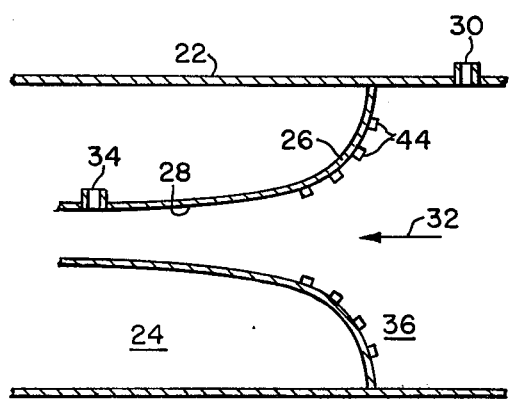
FIG. 5 is a view, similar to FIGS. 3 and 4, showing yet another embodiment of a flow nozzle taught by this invention.

Referring to FIG. 5, a third embodiment of the invention is shown. In FIG. 5, the turbulence promoting means 36 comprise a plurality of vanes 44 disposed on the predetermined portion of the converging section 26 of the nozzle 22. In the like manner, to those embodiments illustrated by FIGS. 3 and 4, the turbulence promoting means 36 serve to trigger the laminar boundary layer into a turbulent boundary layer so as to eliminate the transition hump which occurs in fluid nozzles having a finely polished surface.

It is thus seen that utilization of the teachings of this invention provide a new and improved fluid flow measurement device which, by eliminating the transition from a laminar boundary layer to a turbulent boundary layer, eliminates the transition hump which appears in the relationship between the Discharge Coefficient and the actual flow rate.

By eliminating the laminar-to-turbulent transition, the discharge coefficient for the fluid meter can be accurately predicted. In addition, a reliable basis for extrapolating Discharge Coefficients for higher flow rates is available.

I claim as my invention:

1. A flow nozzle for measuring fluid flow rate of an incompressible fluid in a closed channel, said nozzle comprising:
    a converging portion,
    a cylindrical throat portion adjacent said converging portion,
    turbulence promoting means for converting a laminar boundary layer within said incompressible fluid while said fluid flows within said nozzle to a turbulent boundary layer within said incompressible fluid while said fluid flows within said nozzle, said turbulence promoting means being disposed at a predetermined location on said converging portion,
    a first pressure tap located upstream of said converging portion, and,
    a second pressure tap disposed downstream of and spaced away from said converging portion.

2. The flow nozzle of claim 1 wherein said turbulence promoting means comprise a wire-like ridge disposed circumferentially about the converging portion of the nozzle at said predetermined location thereon.

3. The flow nozzle of claim 1 wherein said turbulence promoting means comprise a roughened knurled portion of said converging portion located at said predetermined location on said converging portion.

4. The flow nozzle of claim 1 wherein said turbulence promoting means comprise a plurality of ridge like protrusions disposed at said predetermined location on said converging portion of said nozzle.

* * * * *